US 6,543,748 B1

(12) United States Patent
Duelli

(10) Patent No.: US 6,543,748 B1
(45) Date of Patent: Apr. 8, 2003

(54) LINEAR MOTION LEADTHROUGH

(75) Inventor: Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/970,524

(22) Filed: Oct. 3, 2001

(51) Int. Cl.$^7$ ............................................. F16K 31/126
(52) U.S. Cl. .................................... 251/335.3; 251/214
(58) Field of Search ............................... 251/335.3, 214

(56) References Cited

U.S. PATENT DOCUMENTS

| | | | | |
|---|---|---|---|---|
| 5,000,215 A | * | 3/1991 | Phillips | 251/335.3 |
| 5,165,652 A | * | 11/1992 | Nicolaisen | 251/335.3 |
| 5,217,043 A | * | 6/1993 | Novakovi | 251/335.3 |
| 5,351,936 A | * | 10/1994 | Tanikawa et al. | 251/335.3 |
| 5,634,627 A | * | 6/1997 | Daido et al. | 251/335.3 |
| 5,673,897 A | * | 10/1997 | Crochet et al. | 251/335.3 |
| 6,305,665 B1 | * | 10/2001 | Coua et al. | 251/335.3 |
| 6,416,037 B1 | * | 7/2002 | Geiser | 251/214 |

FOREIGN PATENT DOCUMENTS

EP 322406 * 6/1989 ............... 251/335.3

* cited by examiner

*Primary Examiner*—Paul J. Hirsch
(74) *Attorney, Agent, or Firm*—Reed Smith LLP

(57) ABSTRACT

A linear motion leadthrough for a rod which has a first end, a second end and an outer surface and whose first end projects into a vacuum area of a vacuum installation while its second end is located outside of the vacuum area, comprises: a bushing which has an inner wall and through which the rod extends and which is displaceable linearly relative to the rod, at least one elastomer sealing ring for sealing the rod relative to the bushing which is secured to the inner wall of the bushing or to the outer surface of the rod, wherein the sealing ring is lubricated by a lubricant, and a bellows which is arranged inside the vacuum area, has a first end and a second end, encloses a portion of the rod located inside the vacuum area and delimits a space located between the rod and the bellows from a space lying outside the bellows, and whose first end is fastened to the rod and whose second end is fastened to the bushing or to a part enclosing the bushing, wherein at least one opening is provided which connects the space between the rod and the bellows with the space outside the bellows.

9 Claims, 2 Drawing Sheets

LINEAR MOTION LEADTHROUGH

BACKGROUND OF THE INVENTION a) Field of the Invention

The invention is directed to a linear motion leadthrough for a rod having a first end, a second end and an outer surface, its first end projects into a vacuum area of a vacuum installation and its second end is located outside of the vacuum area, wherein the linear motion leadthrough comprises:

a bushing which has an inner wall and through which the rod extends and is displaceable linearly relative to the rod, at least one elastomer sealing ring for sealing the rod relative to the bushing which is secured to the inner wall of the bushing or to the outer surface of the rod, wherein the sealing ring is lubricated by a lubricant.

b) Description of the Related Art

Bellows leadthroughs and linear motion leadthroughs are known for purposes of guiding a rod into the vacuum area of a vacuum installation, wherein the rod is to be mounted so as to be displaceable linearly. Bellows leadthroughs, which can be constructed as expansion bellows or corrugated bellows, have the advantage that they are completely vacuum-tight and free from grease, that is, no lubricant is required. The disadvantage of bellows leadthroughs is their high price. These bellows are also critical with respect to application because a strong, rapid intrusion of air into the vacuum can come about in case of failure of the bellows.

In linear motion leadthroughs, the outer surface of the rod is sealed relative to the inner surface of the bushing through which the rod passes into the vacuum area by means of one or more elastomer sealing rings. For example, one or more O-rings which contact the outer surface of the rod can be arranged at the inner wall of the bushing. When the rod is displaced, these O-rings slide along the outer surface of the rod. Other sealing rings such as lip seals are also known.

These linear motion leadthroughs are inexpensive to produce. It is also advantageous that leakage, if it occurs, generally does so at a slow pace so that there will not be any sudden strong influx of air into the vacuum. However, lubrication with lubricant is required for linear motion leadthroughs of this type. Due to repeated displacement of the rod, this lubricant is also pushed in direction of the vacuum-side end of the rod, where lubricant can accumulate over time.

The lubricant can easily spread to other parts in the vacuum area of the vacuum installation. For example, the interiors of vacuum installations are occasionally cleaned by venting and opening the vacuum installation and wiping down the inner walls with cloths. In so doing, the cloth can easily contact accumulated lubricant at the rod so that the lubricant is spread. It has also been observed that accumulations of lubricant often detach by themselves and the lubricant is deposited on other parts of the chamber in a troublesome manner.

Linear motion leadthroughs in which a cover ring is arranged before the final sealing ring on the vacuum side and the rod passes through the cover ring with slight clearance are also already known. A cover ring of this kind can provide a certain degree of protection against unwanted and disadvantageous penetration of particles into this sealing ring. However, it has been observed that a cover of this kind can not permanently hold back the lubricant for the sealing rings, so that accumulations of lubricant can nevertheless develop over the course of time on the portion of the rod projecting into the vacuum.

OBJECT AND SUMMARY OF THE INVENTION

An important object of the invention is to provide a linear motion leadthrough in which the spread of lubricant to other parts in the vacuum area is substantially reduced.

A linear motion leadthrough according to the invention for a rod which has a first end, a second end and an outer surface and whose first end projects into a vacuum area of a vacuum installation while its second end is located outside of the vacuum area, comprises:

a bushing which has an inner wall and through which the rod extends and which is displaceable linearly relative to the rod, at least one elastomer sealing ring for sealing the rod relative to the bushing which is secured to the inner wall of the bushing or to the outer surface of the rod, wherein the sealing ring is lubricated by a lubricant, and a bellows which is arranged inside the vacuum area, has a first end and a second end, encloses a portion of the rod located inside the vacuum area and delimits a space located between the rod and the bellows from a space lying outside the bellows, and whose first end is fastened to the rod and whose second end is fastened to the bushing or to a part enclosing the bushing, wherein at least one opening is provided which connects the space between the rod and the bellows with the space outside the bellows.

Accordingly, in the linear motion leadthrough according to the invention the bellows is not a sealing element for sealing against air or gas and the space enclosed by the bellows forms a part of the vacuum area of the vacuum installation. The at least one opening connecting the space between the rod and the bellows with the space outside the bellows is provided for purposes of pumping out the space enclosed by the bellows. For this purpose, one of more openings can be formed in the bellows itself. It is also conceivable and possible in principle, for example, to provide one or more bore holes in the rod which connect the space outside the bellow with the space enclosed by the bellows.

These one or more openings can be formed so as to be very small with respect to surface in relation to the entire surface of the bellows, so that, in practice, lubricant detaching from the rod does not exit from the opening or openings or, if so, only to an insignificant extent. Further, the bellows forms a protection against contact for the part of the rod enclosed by the bellows so as to prevent spreading of lubricant due to contact with the rod.

In an advantageous embodiment example of the invention, the bellows diaphragm at the first end of the bellows reaches further inward than the other bellows diaphragms, wherein radial notches proceed from the inner edge of this bellows diaphragm so as to form openings in the bellows. A plurality of such notches are provided in circumferential direction, wherein a snap-in tongue which can snap into a snap recess in the rod is delimited by every two notches. The notches provided in this embodiment example accordingly have a dual function: on the one hand, they form openings in the bellows, on the other hand, snap-in tongues are formed for fastening the first end of the bellows to the rod.

The different features and constructions according to the invention are set forth in the claims.

Further advantages and details of the invention are described in the following with reference to the embodiment example shown in the drawings and additional objects of the invention follow therefrom.

DESCRIPTION OF THE PREFERRED EMBODIMENT EXAMPLES

DESCRIPTION OF THE PREFERRED EMBODIMENTS

Figure 1:
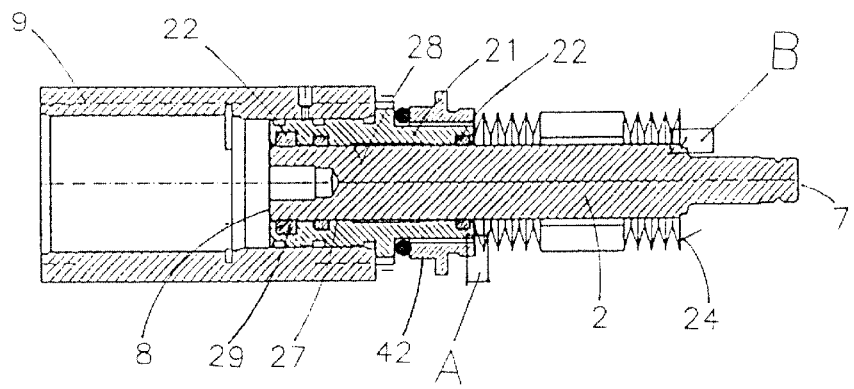
FIG. 1 shows a longitudinal central section through a linear motion leadthrough according to the invention.
Figure 2:
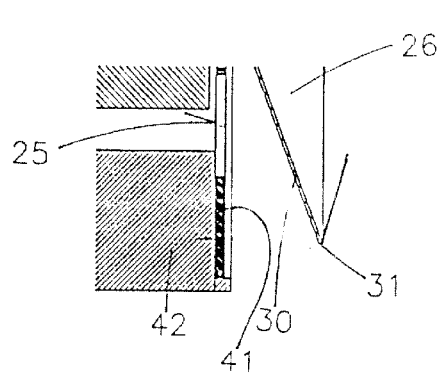
FIG. 2 shows an enlarged detail A of FIG. 1.
Figure 3:
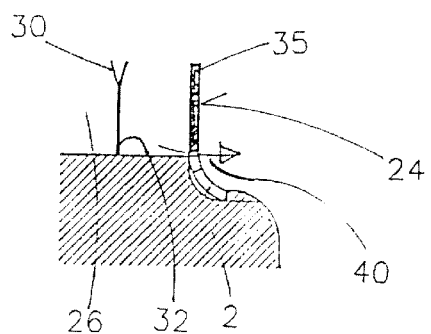
FIG. 3 shows an enlarged detail B of FIG. 1.

A linear motion leadthrough such as that shown in FIG. 1 can be installed, for example, in a vacuum valve. An embodiment form of a vacuum valve of the type mentioned above is shown in FIGS. 6 to 8. The vacuum valve comprises a valve housing which is formed of a main part 3 and a cover part 4. A drive housing 5 in which the drive device for the valve is provided is secured to the cover part 4. A vacuum area 6 of the vacuum installation is located inside the valve housing, and rods 2 project by their first ends 7 into this vacuum area 6, while their second ends 8 are located outside the vacuum area 6 of the vacuum installation.

A valve plate 1 is secured to the first ends 7 of the rods 2. The second ends 8 of the rods 2 project into cylinders 9 and are connected with pistons 10. By means of the displacement of the piston 10 in the cylinder 9, the valve plate I can be displaced from the completely open position shown in FIG. 7 to the position shown in FIG. 8. In this position shown in FIG. 8, the valve plate is located across from the valve opening 11 but does not contact the valve seat 12 (not shown in detail in FIGS. 7 and 8) enclosing the valve opening 11.

Figure 8:
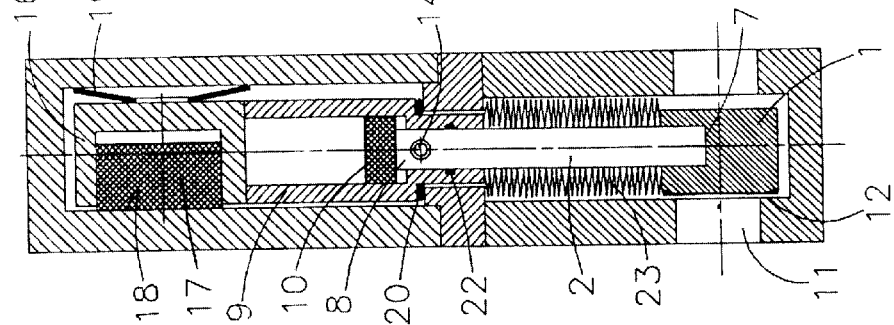

In order for the valve plate 1 to contact the valve seat 12 proceeding from the position of the valve plate 1 shown in FIG. 8, the cylinder 9 together with the rod 2 is mounted so as to be swivelable about the swiveling axis 14 vertical to the rod 2 and to the axis 3 of the valve opening 11. For this purpose, radially projecting pins 15 are provided on both sides of the cylinder 9 and are received in corresponding recesses in the drive housing 5.

Figure 7:
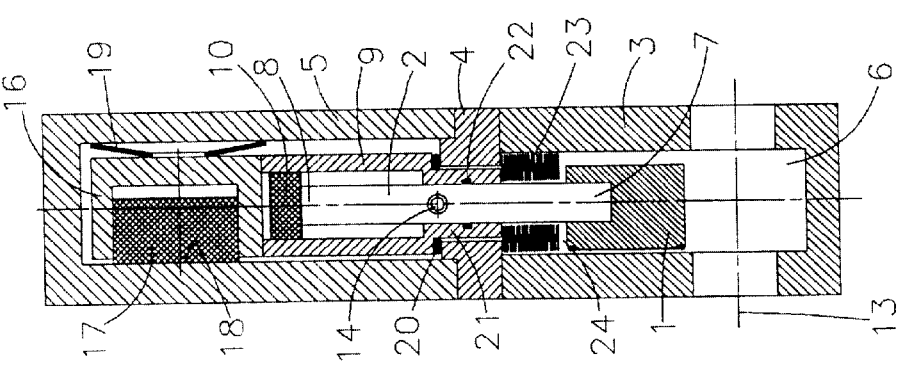
FIGS. 7 and 8 show schematic sections along line DD of FIG. 6 in different open and closed states of the valve.

Another cylinder 16 is rigidly connected to cylinder 9 and has a piston 17, shown schematically in FIGS. 7 and 8 as a plunger, which acts vertical to the rod and to the swiveling axis 14. The end of the piston 17 projecting from the cylinder 16 is supported at the inner wall 18 of the drive housing 5. On the side of the cylinder 16 located opposite the inner wall 18, a spring 19, e.g., in the form of disk spring, is arranged between the cylinder 16 and the drive housing 5 and pretensions cylinder 6 and cylinder 9 in the swiveling position, shown in FIGS. 7 and 8, about the swiveling axis 14. By actuating the piston 17, the cylinder 9 is swiveled about the swiveling axis 14 so that the seal arranged at the valve plate 1 is pressed against the sealing surface arranged at the valve seat 12 and the valve occupies its completely closed position.

The tilting leadthroughs which make it possible for the cylinder 9 to swivel about the swiveling axis 4 while the cylinder 9 is sealed relative to the cover part 4 of the valve housing comprise, in each instance, a sealing ring in the form of an O-ring 20 which is pressed in axial direction. This O-ring 20 is located between sealing surfaces which face one another and which are provided at the cylinder 9 on one side and at the cover part 4 of the valve housing on the other side and are spaced apart in axial direction of the rod 2. In the position of the cylinder 9 in which it is not tilted (FIGS. 7 and 8), the O-ring 20 is evenly deformed along its circumference, wherein there is a medium deformation of the O-ring. When the cylinder 9 is tilted, there is a greater deformation of this O-ring 20 on one side of the O-ring and less deformation on the opposite side, wherein the minimum deformation ensuring tightness is still provided. The swiveling axis 14 extends through the central area of the O-ring 20.

Figure 6:
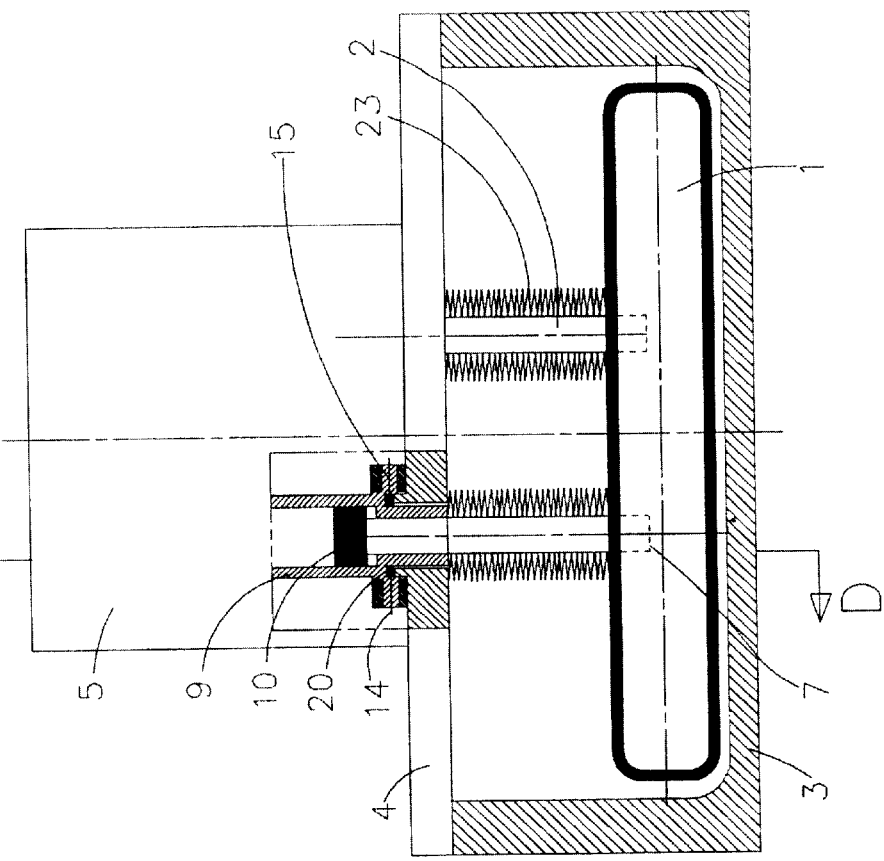
FIG. 6 is a schematic front view of a vacuum valve with a linear motion leadthrough according to the invention, partly in section.

The linear motion leadthroughs for the rods 2 comprise a bushing 21 which is constructed in FIGS. 6 to 8 so as to form one piece with the cylinder 9. However, in an advantageous manner (to simplify assembly, disassembly and production), these can also be separate parts which are connected to one another (as will be described in the following with reference to FIG. 1). At least one elastomer sealing ring 22, shown only schematically in FIGS. 6 to 8, is provided for sealing the rod 2 relative to the bushing 21. The linear motion leadthrough further comprises a bellows 23 which is arranged inside the vacuum area 6 and which encloses a portion of the rod 2 located inside the vacuum area. The length of this portion depends upon the displacement position of the rod 2. The first end 24 of the bellows 23 which faces the first end 7 of the rod 2 is fastened to the rod 2. The opposite, second end 25 can be secured directly to the bushing 21 (in so doing, it is preferable that the opening in the cover part 4 is large enough so that the bellows secured to the rod and to the bushing can be pulled through this opening for disassembling the valve). The second end 25 of the bellows can also be secured to the cover part 4 enclosing the bushing 21 or to a part connected with the latter as will be explained more fully in the following. Further, at least one opening (not visible in FIGS. 6 to 8) is provided in the bellows 23 and connects the space 26 enclosed by the bellows with the outer space of the bellows 23. This makes it possible to pump out the space 26, that is, the space 26 forms part of the vacuum area 6.

A possible embodiment example of a linear motion leadthrough according to the invention is shown in greater detail in FIGS. 1 to 5. A sealing ring 29 in the form of a lip seal and sealing rings 22 in the form of O-rings are provided between the outer surface 27 of the rod 2 and the inner wall 28 of the bushing 21. These sealing rings are preferably secured to the inner wall of the bushing 21. In principle, it is also conceivable and possible to provide one or more sealing rings at the outer surface 27 of the rod 2; however, the displacing area of the rod 2 would then be limited by the length of the bushing 21. Other arrangements and types of sealing rings 22, 29 are also possible. In this case, the bushing 21 is connected with a cylinder 9 by seals. A piston is arranged at the second end 8 of the rod 2.

A lubricant for lubricating the sealing rings 22, 29 is distributed at the outer surface of the rod and/or at the inner wall of the bushing 21.

A portion of the rod 2 projecting into a vacuum area of a vacuum installation by its first end 7 is enclosed by bellows 23. The bellows 23 which is constructed in this case as expansion bellows or diaphragm bellows has a plurality of diaphragms 30 in conventional manner. The outer and inner edges 31, 32 of the successive diaphragms are connected, e.g., welded, with one another. Each individual diaphragm has an approximately conical outer shape and can also be corrugated. In contrast to conventional diaphragm bellows which are provided as sealing bellows, there may be fewer diaphragms per length area, so that production is simplified. For example, twenty to twenty-five pairs of diaphragms can be provided for a travel of 45 mm, wherein the bellows has a length of 15 mm when pushed together and a length of 60 mm when drawn apart.

Figure 4:
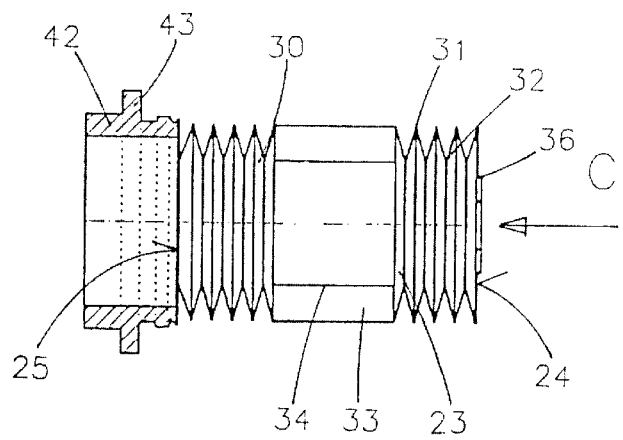
FIG. 4 shows the bellows, partly in section.
Figure 5:
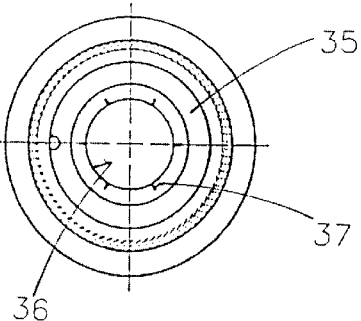
FIG. 5 shows a front view of the bellows (viewing direction C in FIG. 4)

The diaphragms located in the central area of the bellows are not illustrated in FIG. 4; rather, these diaphragms are indicated by lines 33, 34 representing the outer and inner edges 31, 32 of these diaphragms. The foremost diaphragm 35 in the first end 24 of the expansion bellows is flat and its inner edge 36 reaches farther inward than the inner edges 32 of diaphragms 30. Radial notches 37 which form openings in the bellows 23 proceed from the inner edge 36. The width of these openings can be in the range of 0.2 mm, for example. A plurality of notches 37 of the type mentioned above are provided in circumferential direction, wherein two adjacent notches 37 delimit a snap-in tongue 38. The snap-in tongues are bent away from the bellows and have a certain spring elasticity. These snap-in tongues 38 can snap into snap recesses 39 which are formed as groove-shaped depressions in a part of the rod 20 that extends radially inward. The first end 24 of the bellows 23 is fastened to the rod 2 in this way. A small part of the notch 37 remains open so that air located in the space 26 can be pumped out through these openings, which is indicated by arrow 40 in FIG. 3.

A flat diaphragm 41 which is welded to a bellows end piece is provided at the second end 25 of the bellows 23. The bellows end piece has an annular flange 43 by which it can be connected to the cover part 4 of the valve housing. The O-ring 20 can contact corresponding sealing surfaces between the front end of the bellows end piece 42 and an annular flange at the bushing 21, wherein these O-rings define a vacuum space.

It is possible to modify the embodiment example shown herein in various ways without departing from the field of the invention. Linear motion leadthroughs constructed according to the invention can be provided for different applications apart from valve rods, such as linear motion leadthroughs for manipulator rods. When a linear motion leadthrough according to the invention is used as a leadthrough for a valve rod of a vacuum valve, this vacuum valve can also be constructed in a manner other than that described.

The bellows 23 can be made of metal, for example, particularly special steel. Other metals such as titanium or different nickel alloys could also be used. The bellows could also be made from a suitable plastic. It would also be conceivable to use Teflon or PEEK plastic. While the latter is less elastic, a sufficient elasticity of the bellows could be achieved by means of suitable notches which could be covered if necessary.

Openings other than those shown herein could also be provided in the bellows for pumping out the space enclosed by the bellows 23. Instead of openings in the bellows, or in addition to these openings, openings connecting the space 26 with the outer space of the bellows could also be provided in another part adjoining this space 26.

Instead of the snap-in connection between the first end of the bellows 23 and the rod 2, another means for fastening this end to the rod could also be provided. A fastening of this kind could also be carried out by means of an adapter.

The field of the invention is not limited to the embodiment example shown herein, but should be defined with reference to the appended claims together with their full scope of possible equivalents.

While the foregoing description and drawings represent the present invention, it will be obvious to those skilled in the art that various changes may be made therein without departing from the true spirit and scope of the present invention.

REFERENCE NUMBERS 1 valve plate
2 rod
3 main part
4 cover part
5 drive housing
6 vacuum area
7 first end
8 second end
9 cylinder
10 piston
11 valve opening
12 valve seat
13 axis
14 swiveling axis
15 pin
16 cylinder
17 piston
18 inner wall
19 spring
20 O-ring
21 bushing
22 sealing ring
23 bellows
24 first end
25 second end
26 space
27 outer surface
28 inner wall
29 sealing ring
30 diaphragm
31 outer edge
32 inner edge
33 line
34 line
35 diaphragm
36 inner edge
37 notch
38 snap-in tongue
39 snap recess
40 arrow
41 diaphragm
42 bellows end piece
43 annular flange

What is claimed is:

1. A linear motion leadthrough for a rod which has a first end, a second end and an outer source and whose first end projects into a vacuum area of a vacuum installation while its second end is located outside of the vacuum area, comprising:

a bushing which has an inner wall and through which the rod extends and which is displaceable linearly relative to the rod;

at least one elastomer sealing ring for sealing the rod relative to the bushing which is secured to the inner wall of the bushing or to the outer surface of the rod, wherein the sealing ring is lubricated by a lubricant; and a bellows which is arranged inside the vacuum area, has a first end and a second end, encloses a portion of the rod located inside the vacuum area and delimits a space located between the rod and the bellows from a space lying outside the bellows, and whose first end is fastened to the rod and whose second end is fastened to the bushing or to a part enclosing the bushing, wherein at least one opening is provided which connects the space between the rod and the bellows with the space outside the bellows.

2. The linear motion leadthrough according to 1, wherein the bellows is an expansion bellows comprising successive diaphragms which are alternately connected with one another by their inner and outer edges.

3. The linear motion leadthrough according to claim 2, wherein an end diaphragm in the first end has an inner edge which reaches farther inward than the inner edges of the subsequent diaphragms, and wherein radial notches are provided proceeding from this inner edge, which radial notches form the openings between the space between the rod and bellows and the space outside the bellows.

4. The linear motion leadthrough according to claim 3, wherein a plurality of such notches are provided in circumferential direction and a snap-in tongue which can snap into a snap recess in the rod is delimited by every two notches.

5. The linear motion leadthrough according to claim 1, wherein a valve plate of a vacuum valve is arranged at the first end of the rod.

6. The linear motion leadthrough according to claim 5, wherein the second end of the rod projects into a cylinder and is connected with a piston.

7. The linear motion leadthrough according to claim 1, wherein the second end of the bellows is fastened to a bellows end piece.

8. The linear motion leadthrough according to claim 7, wherein the bellows end piece is fastened to a valve housing of a vacuum valve.

9. The linear motion leadthrough according to claim 1, wherein the diaphragms of the bellows are made of special steel.

* * * * *